(12) United States Patent
Ansari et al.

(10) Patent No.: US 9,129,060 B2
(45) Date of Patent: Sep. 8, 2015

(54) QOS BASED DYNAMIC EXECUTION ENGINE SELECTION

(75) Inventors: Najeeb I. Ansari, San Jose, CA (US);
Michael Carns, San Jose, CA (US);
Jeffrey Schroeder, San Jose, CA (US);
Bryan Chin, San Diego, CA (US)

(73) Assignee: Cavium, Inc., San Jose, CA (US)

( * ) Notice: Subject to any disclaimer, the term of this patent is extended or adjusted under 35 U.S.C. 154(b) by 526 days.

(21) Appl. No.: 13/272,975

(22) Filed: Oct. 13, 2011

(65) Prior Publication Data

US 2013/0097350 A1 Apr. 18, 2013

(51) Int. Cl.
*G06F 9/50* (2006.01)
*G06F 13/362* (2006.01)

(52) U.S. Cl.
CPC ............... *G06F 13/362* (2013.01); *G06F 9/50* (2013.01); *G06F 9/5044* (2013.01)

(58) Field of Classification Search
CPC .................................... G06F 9/30; G06F 9/38
USPC .......................................................... 712/214
See application file for complete search history.

(56) References Cited

U.S. PATENT DOCUMENTS

| | | | |
|---|---|---|---|
| 5,745,778 A * | 4/1998 | Alfieri .............................. 712/1 |
| 6,189,074 B1 | 2/2001 | Pedneau | |
| 6,253,262 B1 | 6/2001 | Rozario et al. | |
| 6,289,369 B1 * | 9/2001 | Sundaresan ................... 718/103 |
| 6,356,989 B1 | 3/2002 | Hays et al. | |
| 6,496,847 B1 | 12/2002 | Bugnion et al. | |
| 6,789,147 B1 | 9/2004 | Kessler et al. | |
| 6,861,865 B1 | 3/2005 | Carlson | |
| 6,862,694 B1 | 3/2005 | Tormey et al. | |
| 6,954,770 B1 | 10/2005 | Carlson et al. | |
| 7,035,889 B1 | 4/2006 | Carlson et al. | |
| 7,076,059 B1 | 7/2006 | Kiszely | |
| 7,205,785 B1 | 4/2007 | Carlson | |
| 7,209,531 B1 | 4/2007 | Katz et al. | |
| 7,240,203 B2 | 7/2007 | Kessler et al. | |

(Continued)

OTHER PUBLICATIONS

Notice of Allowance mailed Feb. 13, 2015, issued in U.S. Appl. No. 13/272,937, entitled "Processor With Dedicated Virtual Functions and Dynamic Assignment of Functional Resources".

(Continued)

*Primary Examiner* — Boris Gorney
*Assistant Examiner* — Yuqing Xiao
(74) *Attorney, Agent, or Firm* — Hamilton, Brook, Smith & Reynolds, P.C.

(57) ABSTRACT

In one embodiment, a processor includes plural processing cores, and plural instruction stores, each instruction store storing at least one instruction, each instruction having a corresponding group number, each instruction store having a unique identifier. The processor also includes a group execution matrix having a plurality of group execution masks and a store execution matrix comprising a plurality of store execution masks. The processor further includes a core selection unit that, for each instruction within each instruction store, selects a store execution mask from the store execution matrix. The core selection unit for each instruction within each instruction store selects at least one group execution mask from the group execution matrix. The core selection unit performs logic operations to create a core request mask. The processor includes an arbitration unit that determines instruction priority among each instruction, assigns an instruction for each available core, and signals the instruction store.

29 Claims, 7 Drawing Sheets

(56) References Cited

U.S. PATENT DOCUMENTS

| | | |
|---|---|---|
| 7,260,217 B1 | 8/2007 | Carlson |
| 7,275,249 B1 * | 9/2007 | Miller et al. ................... 718/105 |
| 7,305,567 B1 | 12/2007 | Hussain et al. |
| 7,310,722 B2 * | 12/2007 | Moy et al. ..................... 712/207 |
| 7,337,314 B2 * | 2/2008 | Hussain et al. ............... 713/151 |
| 7,372,857 B1 | 5/2008 | Kappler et al. |
| 7,398,386 B2 | 7/2008 | Kessler et al. |
| 7,421,533 B2 | 9/2008 | Zimmer et al. |
| 7,657,933 B2 | 2/2010 | Hussain et al. |
| 7,661,130 B2 | 2/2010 | Hussain et al. |
| 7,814,310 B2 | 10/2010 | Bouchard et al. |
| 8,156,495 B2 * | 4/2012 | Chew et al. ................... 718/102 |
| 8,424,014 B2 | 4/2013 | Auernhammer et al. |
| 8,504,750 B1 | 8/2013 | Sonksen et al. |
| 8,881,150 B2 | 11/2014 | Sawa et al. |
| 8,892,962 B2 | 11/2014 | Iwanga et al. |
| 2004/0216101 A1 | 10/2004 | Burky et al. |
| 2004/0268105 A1 | 12/2004 | Michaelis et al. |
| 2005/0235123 A1 | 10/2005 | Zimmer et al. |
| 2006/0288189 A1 | 12/2006 | Seth et al. |
| 2007/0220203 A1 | 9/2007 | Murase |
| 2008/0013715 A1 * | 1/2008 | Feghali et al. ................. 380/28 |
| 2008/0074433 A1 * | 3/2008 | Jiao et al. ..................... 345/522 |
| 2008/0077909 A1 | 3/2008 | Collins et al. |
| 2008/0133709 A1 | 6/2008 | Aloni et al. |
| 2008/0320016 A1 | 12/2008 | Singh et al. |
| 2009/0024804 A1 | 1/2009 | Wheeler et al. |
| 2009/0070768 A1 * | 3/2009 | Choudhury et al. .......... 718/104 |
| 2009/0249094 A1 * | 10/2009 | Marshall et al. .............. 713/320 |
| 2009/0300606 A1 | 12/2009 | Miller et al. |
| 2010/0082603 A1 | 4/2010 | Krompass et al. |
| 2010/0138829 A1 | 6/2010 | Hanquez et al. |
| 2010/0205603 A1 | 8/2010 | Merten et al. |
| 2010/0275199 A1 | 10/2010 | Smith et al. |
| 2010/0332212 A1 | 12/2010 | Finkelman |
| 2011/0161943 A1 * | 6/2011 | Bellows et al. ............... 717/149 |
| 2011/0314478 A1 * | 12/2011 | Louise et al. ................. 718/104 |
| 2012/0096192 A1 | 4/2012 | Tanaka et al. |
| 2012/0179844 A1 | 7/2012 | Brownlow et al. |
| 2012/0260257 A1 | 10/2012 | Accapadi et al. |
| 2013/0055254 A1 | 2/2013 | Avasthi et al. |
| 2013/0097598 A1 | 4/2013 | Schroeder et al. |

OTHER PUBLICATIONS

"Single Root I/O Virtualization and Sharing Specification Revision 1.0$\underline{1}$," PCI-SIG®, pp. 1-100 (Jan. 20, 2010).

\* cited by examiner

QOS BASED DYNAMIC EXECUTION ENGINE SELECTION

BACKGROUND

In the field of computer networking and other packet-switched telecommunication networks, quality of service (QoS) refers to an ability to provide different priority to different applications, users, or data flows, or to guarantee a certain level of performance to a data flow. For example, a QoS scheme may guarantee a required bit rate, delay, jitter, packet dropping probability and/or bit error rate. QoS guarantees are important for real-time streaming multimedia applications that are delay sensitive and have fixed bit rates, such as voice over IP, online games and video.

In processors with multiple cores, a host or software will often view the processor as one machine despite the processor having multiple cores. When the host or software runs several simultaneous processes, it will treat the processor as one machine, when it could be advantageous to treat it as multiple machines for the multiple processes. Few hardware mechanisms currently exist that regulate QoS of instructions from a host or software.

SUMMARY

In one embodiment, a processor comprises a plurality of processing cores, and a plurality of instruction stores, each instruction store storing at least one instruction, each instruction having a corresponding group number, each instruction store having a unique identifier. The processor also comprises a group execution matrix comprising a plurality of group execution masks and a store execution matrix comprising a plurality of store execution masks.

The processor also comprises a core selection unit configured to, for each instruction within each instruction store, select a store execution mask from the store execution matrix using the unique identifier of a selected instruction store as an index. The core selection unit is further configured to, for each instruction within each instruction store, select at least one group execution mask from the group execution matrix using the group number of at least one selected instruction from the selected instruction store as an index. The core selection unit is configured to, for each instruction within the instruction store and for each group execution mask of the at least one group execution masks, perform logic operations on the selected group execution mask and the store execution mask to create a core request mask, the core request mask corresponding to the selected instruction store and indicating zero, one, or more candidate cores. The core selection unit is further configured to perform a bitwise and—operation on the selected group execution mask and the selected store execution mask to create the core request mask corresponding to the selected instruction store.

The processor also comprises an arbitration unit configured to determine instruction priority among each instruction, each instruction store having at least one corresponding core request mask, accordingly assign an instruction for each available core, where the core request mask corresponding to the instruction store of the instruction indicates candidate cores that intersect with the available cores, and signal the instruction store corresponding to the assigned instruction to send the assigned instruction to the available core.

In one embodiment, a method comprises, on the clock cycle of a processor with a plurality of cores and plurality of instruction stores, and for each instruction within the instruction stores, selecting a store execution mask from a store execution matrix using a unique identifier of a selected instruction store as an index and selecting at least one group execution mask from a group execution matrix using a group number corresponding to an instruction of the selected instruction store as an index.

For each selected group execution mask of the group execution masks, logic operations are performed on at least the selected group execution mask and the selected store execution mask to create a core request mask, the core request mask corresponding to the selected instruction store and indicating zero, one, or more candidate cores, each core request mask added to a core request matrix indexed by the unique identifier of each instruction store. Then, on the clock cycle of the processor, arbitrating to determine instruction priority among the individual instructions corresponding to the plurality of core request masks, assigning an instruction to each available core, where a core request mask corresponding to the instruction store of the instruction indicates candidate cores that intersect with the available cores, signaling the instruction store corresponding to the assigned instruction to send the assigned instruction to the available core.

The instruction store can also include a queue, and the core selection unit can be configured to select one group number corresponding to the instruction at the front of this queue. The instruction store can also be configured to dispatch an instruction to any of the plurality of cores. Each instruction store can be assigned to one of a plurality of virtual functions.

The arbitration unit can determine instruction priority among the virtual functions by a method of hardware arbitration.

Virtual function arbitration units can determine instruction priority within the virtual function by a method of hardware arbitration. The virtual function arbitration units can be configured to determine instruction priority among the instruction stores. The virtual functions can interface with a host, receive instructions and distribute instructions to its corresponding instruction stores.

The core selection unit can perform a bitwise and—operation on a core availability vector, the selected group execution mask, the selected store execution mask, and the core availability vector to create the core request mask corresponding to the selected instruction store.

The processor can also comprise a dispatch unit that receives a unique identifier of the one instruction store and an identification number of an available core and produces a signal to the selected instruction store to issue an instruction to the available core indicated by the identification number.

The group execution matrix and store execution matrix is set to affect the quality of service of a physical function or a virtual function among the plurality of cores.

Instruction stores can include compression instruction stores, cryptography instruction stores, video processing instruction stores, image processing instruction stores, or general instruction stores. Each instruction store is assigned to a physical function, and the arbitration unit is configured to determine instruction priority within the physical function by a method of hardware arbitration.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
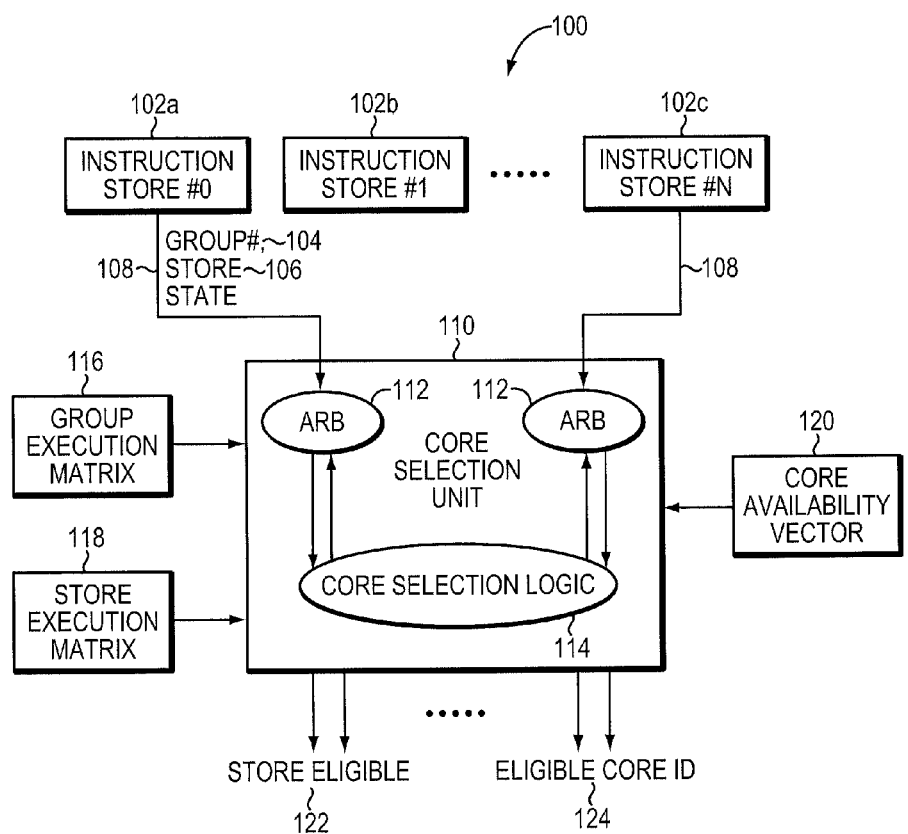
FIG. 1 is a block diagram of a processor with a core selection unit.

A description of example embodiments of the invention follows.

The teachings of all patents, published applications and references cited herein are incorporated by reference in their entirety.

Treating the cores as one machine makes regulation of the QoS difficult among multiple processes in a host or software. Creating a QoS scheme within a processor allows software to prioritize different processes or groups of processes without using additional software resources or memory.

A processor contains two instruction store managers that fetch and dispatch instructions. In one embodiment, the processor is coupled to a host processor with software and memory. An instruction store manager (ISM) contains cryptography related instructions. A zip store manager (ZSM) contains compress/decompression related instructions. This specification refers primarily to ISMs, which will refer to both ISMs as defined above and ZSMs, as a person of ordinary skill in the art should be able to interchange the two.

The ISM fetches instructions from host memory and dispatches instructions to execution engines based on Quality of Service (QoS) parameters. In one embodiment, the ISM has 64 stores and each store within the ISM, or ISM store (ISMS), can belong to physical function (PF) or a particular virtual function (VF) based on the programmed mode. In one embodiment, the instruction stores are any data structure capable of storing an instruction. In another embodiment, the instruction stores within the ISM are queues. Once instructions have populated a work store in the host memory, software signals a corresponding store in the ISM and that ISMS fetches the instruction if that ISMS has available space.

As an example of the similarity of the ISM and ZSM, the ZSM also fetches instructions from host memory and dispatches instructions to execution engines based on QoS parameters. There are 64 stores in ZSM and each ZSM store (ZSMS) can belong to PF or a particular VF based on the programmed mode. Once instructions have populated a work store in the host memory, software signals a corresponding store in the ZSM and that ZSMS fetches the instruction if that ZSMS has available space.

In an embodiment, the processor has four VF modes in addition to the PF mode. The four VF modes are named VF8, VF16, VF32 and VF64. VF8 uses 8 virtual functions, VF16 uses 16 virtual functions, VF32 uses 32 virtual functions, and VF64 uses 64 virtual functions. In addition, in VF8 each VF contains 8 instruction stores, in VF16 each VF contains 4 instruction stores, in VF32 each VF contains 2 instruction stores, and in VF64 each VF contains 1 instruction store. Likewise in any of the VF modes, stores within the VF are always numbered from 0 to N-1, where N is the number of instruction stores per VF. N is 8 for VF8, 4 for VF16, 2 for VF32 and 1 for VF 64. Other embodiments can have a different number of VFs or divide resources among the VFs differently.

In PF mode, the instruction stores are numbered from 0 to 63 (64 for ISM and 64 for ZSM) and are grouped into one physical function.

The ISM is responsible for dispatching instructions from the instruction stores to execution engines, or cores. To dispatch an instruction, the ISM selects execution engines from a list of available engines. A software selectable Round Robin or Fixed Priority arbitration algorithm may be employed for core selection. The host or software sets a 64-bit store execution mask for each instruction store of cores indicating where the instruction store can dispatch an instruction. Each instruction store has its own store execution mask, which are all stored together in a store execution matrix and are programmed by software to implement QoS policies.

In addition, each instruction is associated and stored with a group number. In one embodiment, there are eight groups. Likewise, the ISM contains eight 64-bit group execution masks, each mask corresponding to one group number and indicating to which cores a particular group is allowed to dispatch. Likewise, for any particular instruction, core eligibility may be determined by the following criteria, where N is any core number from 0-63.

1. Core N is available.
2. An instruction store's execution mask indicates that it may dispatch an instruction to core N.
3. The instruction of the instruction store is associated with group M (0 to 7).
4. The group execution mask of group M indicates that it may dispatch the instruction to core N.

The eligibility is determined by performing a bitwise AND of the instruction's instruction store execution mask and the group execution mask for a particular core. If this result is non-zero, then the instruction is considered eligible for dispatch and participates in the instruction scheduling round.

In PF mode, the processor only has one global arbitration level. Global arbitration uses a method of hardware arbitration that is software selectable between different methods of instruction arbitration. Methods of hardware arbitration may include, e.g., round robin arbitration, weighted round robin arbitration, fixed priority arbitration, and random arbitration. In fixed priority, instruction store 0 has the highest priority, instruction store 63 has the lowest priority, where the priority of all other instruction stores increments accordingly. A person of ordinary skill in the art could include other implementations of fixed priority arbitration or fixed priority algorithms.

In VF mode (VF8, VF16, VF32, VF64), there are two levels of arbitration. First, local arbitration arbitrates between instruction stores within a virtual function using a method of hardware arbitration. Methods of hardware arbitration may include, e.g., round robin arbitration, weighted round robin arbitration, fixed priority arbitration, and random arbitration. In fixed priority mode, lower numbered instruction stores have a higher priority.

Within each VF, the local arbitration selects one instruction of the plurality of instruction stores to represent the VF. Global arbitration then arbitrates between the instructions chosen by the local arbitration within each VF using a method of hardware arbitration. Again, methods of hardware arbitration can include round robin arbitration, weighted round robin arbitration, fixed priority arbitration, and random arbitration. When global arbitration is in fixed priority mode, priority is assigned by VF number, where the lowest VF numbers have the highest priority. Arbitration decisions are made on a cycle by cycle basis. In VF mode, the global arbitration among the VF's has a higher precedence than local arbitration within a VF. For example, if global arbitration is round robin, then each VF will be considered for issuing one instruction before intra-VF arbitration is considered.

When operating in any one of the VF modes, the physical instruction stores may be assigned to VFs in an interleaved manner as shown in the example table below.

| VF Mode | VF Instruction Store Number | PF Instruction Store Number |
|---|---|---|
| VF8 | X -> ISMS0 (ZSMS0) | 0 + X |
| X = VF# = 0 ... 7 | X -> ISMS1 (ZSMS1) | 8 + X |
| | X -> ISMS2 (ZSMS2) | 16 + X |
| | X -> ISMS3 (ZSMS3) | 24 + X |
| | X -> ISMS4 (ZSMS4) | 32 + X |
| | X -> ISMS5 (ZSMS5) | 40 + X |
| | X -> ISMS6 (ZSMS6) | 48 + X |
| | X -> ISMS7 (ZSMS7) | 56 + X |
| VF16 | X -> ISMS0 (ZSMS0) | 0 + X |
| X = VF# = 0 ... 15 | X -> ISMS1 (ZSMS1) | 16 + X |
| | X -> ISMS2 (ZSMS2) | 32 + X |
| | X -> ISMS3 (ZSMS3) | 48 + X |
| VF32 | X -> ISMS0 (ZSMS0) | 0 + X |
| X = VF# = 0 ... 31 | X -> ISMS1 (ZSMS1) | 32 + X |
| VF64 | X -> ISMS0 (ZSMS0) | X |
| X = VF# = 0 ... 63 | | |

Example PF QoS Configuration:
Group0_Mask: 0x0000_0000_0000_FFFF
Group1_Mask: 0xFFFF_FFFF_FFFF_0000
ISMS0_Mask: 0x0000_0000_0000_5555
ISMS1_Mask: 0x0000_0000_0000_FFFF
ISMS2_Mask: 0x5555_5555_5555_0000
ISMS3_Mask: 0xFFFF_FFFF_FFFF_0000

In this setup above, _Mask is the bit vector of eligible execution engines, represented in hexadecimal notation. One of skill in the art can appreciate that the Group0_Mask would activate cores 0-15, and Group 1_Mask would activate cores 16-63. Likewise, ISMS0_Mask would activate all even cores between 0-15 and ISMS1_Mask would activate all cores between 0-15. ISMS2_Mask would activate all even cores between 16-63 and ISMS3_Mask would activate all cores between 16-63.

If ISMSs 0 and 1 get Group 0 instructions and ISMSs 2 and 3 get Group 1 instructions, the store execution masks would remain the same since the group execution mask 0 activates all cores in ISMS0 and ISMS1 and group execution mask 1 activates all cores in ISMS2 and ISMS3. Therefore, ISMSs 1 and 3 can dispatch instructions to twice as many engines and therefore have twice as much throughput. This example is simplified, as software can setup any ISMS to work with many instruction groups.

Example VF QoS Configuration:
Group0_Mask: 0x0000_0000_0000_FFFF
VF0_ISMS00_Mask: 0x0000_0000_0000_5555
VF0_ISMS32_Mask: 0x0000_0000_0000_5555
VF1_ISMS01_Mask: 0x0000_0000_0000_FFFF
VF1_ISMS33_Mask: 0x0000_0000_0000_FFFF In this setup above, there are two VFs using group_0 (VF0 and VF1). In VF32 mode (for this example), each VF has two instruction stores. This example also shows the physical to virtual mapping, where VF0 includes physical instruction stores 0 and 32, and VF1 includes physical instruction stores 1 and 33. If VF1 needs more resources than VF0, software should set the masks appropriately to adjust the QoS. In this example, both VF0 and VF1 share even numbered cores, while only VF1 can use odd numbered cores. A person of ordinary skill of the art can appreciate that software programming of the group execution masks and store execution masks can control the QoS intra-VF and inter-VF. The features described above allow the group execution masks and store execution marks to create different Quality of Service policies between virtual functions and within virtual functions of a device.

The instruction store manager can be reused to feed instructions to a cryptography unit and a compression unit. The design is agnostic to the instructions contained within the instruction stores. Any type of processing instruction may be stored and dispatched to execution units the logic of the instruction store. Two separate instruction store managers can fetch instructions from a host's memory and issue instructions independently to cryptography unit, compression unit, or other type of unit as explained above. This device incorporates both instructions for cryptography and instructions for data compression/decompression in separate store structures.

Figure 7:
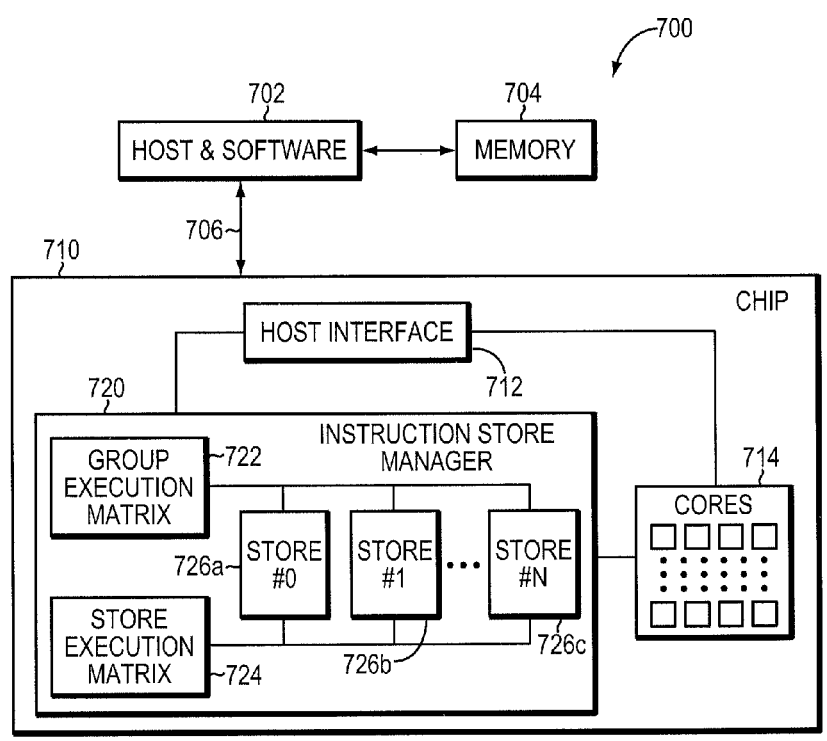
FIG. 7 is an example embodiment of the interaction between a chip with virtual functions and a core selection unit with an arbitration unit and a host system with software.

FIG. 1 is a block diagram of a processor with a core selection unit 110. As shown in FIG. 7, the processor contains a plurality of cores 714. Returning to FIG. 1, the core selection unit 110 is coupled with a plurality of instruction stores 102A-C through an instruction store bus 108. Instruction store 102A is indexed with the number 0, instruction store 102B is indexed with the number 1, and instruction store 102C is indexed with the number N. The index of instruction store 102C N can be any positive integer. A person of ordinary skill in the art should appreciate that a corresponding instruction store indexed to every integer between 1 and N will be coupled to the core selection unit in a similar manner as instruction stores 102A-C. As such, there will be N+1 total instruction stores. In one embodiment, N can be 63, totaling 64 instruction stores.

The instruction stores 102A-C can be any data structure that can store work for a processor. In one embodiment, the instruction stores 102A-C may be a content adjustable memory. In another embodiment, the instruction stores 102A-C may be a queue. In addition, while the instruction stores 102A-C store instructions for the core of a processor in one embodiment, they may also store any other type of work for a processor, e.g. memory operations.

In one embodiment, the instruction stores 102A-C can store instructions for cryptography or for compression. Some embodiments can contain more than one set of instruction stores for different applications. Example embodiments of instruction stores are cryptography instruction stores, compression instruction stores, video processing instruction stores, image processing instruction stores, general instruction stores, or general processing instruction stores, or miscellaneous instruction stores.

The instruction store bus 108 transmits information from the instruction stores 102A-C to the core selection unit 110. This information can include a group number 104 and a store state 106. The group number 104 is a property of the instruction stored in the instruction store 102A-C. In one embodiment, the group number is not part of the instruction itself, but is associated and stored together with the instruction. As shown later in the specification, the group number is a property of the instruction that is a factor in selecting an eligible core of the processor to process that instruction. The instruction store state 106 relates to the state of the instruction store 102A-C.

The core selection unit 110 contains a plurality of arbitration units 112 and core selection logic 114. The core selection unit 110 operates in two different modes, a physical function mode and a virtual function mode. In the physical function mode, the core selection unit 110 groups all of the instruction stores 102A-C into one physical function. A single arbitration unit then uses a method of hardware arbitration to select an instruction of the physical function for processing by an available core of the processor. The method of hardware arbitration can be any method of arbitration. Examples methods of hardware arbitration include round robin arbitration, weighted round robin arbitration, fixed priority arbitration, and random arbitration.

In the virtual function mode, the core selection unit 110 is configured to create a plurality of virtual functions. In some embodiments, the core selection unit 110 creates 8, 16, 32, or 64 virtual functions. These four levels of virtual functions are modes of the core selection unit 110, which can be set by the processor, and are referred to as VF8, VF16, VF32, and VF64 respectively. It should be appreciated by a person of skill in the art that a processor with a different number of instruction stores 102A-C correlates to a different number of virtual functions. The core selection unit 110 groups each instruction store 102A-C into one of a plurality of virtual functions. In one embodiment, the instruction stores 102A-C are distributed evenly among the virtual functions.

Multiple arbitration units 112 are configured to use a method of hardware arbitration to select an instruction within each virtual function using a method of hardware arbitration. Then, second level of arbitration selects an instruction among each of the virtual functions. The method of hardware arbitration can be any method of arbitration. Examples methods of hardware arbitration include round robin arbitration, weighted round robin arbitration, fixed priority arbitration, and random arbitration.

It should be appreciated by a person of ordinary skill in the art that when the instruction store is configured to output more than one instruction to the core selection unit, a level of arbitration among the instructions in each instruction store can be integrated into the processor.

The core selection unit 110 also includes a group execution matrix 116, a store execution matrix 118, and a core availability vector 120. Both the group execution matrix 116 and store execution matrix 118 are set by a host or software. The group execution matrix 116 includes a plurality of group execution masks. Each group execution mask corresponds to a group number 104 and indicates which cores can process an instruction from that group number 104. The store execution matrix includes a plurality of store execution masks. Each store execution mask corresponds to an instruction store 102A-C and indicates which cores can process an instruction from that instruction store 102A-C. The core availability vector 120 indicates which core or cores are idle and available to process an instruction.

The core selection logic 114 and arbitration units 112 of the core selection unit 110 determine which instruction store can send an instruction to a core. The core selection unit outputs an eligible instruction store 122 and the eligible core ID 124 corresponding to the core that will process the instruction. In an embodiment where each instruction store transmits multiple instructions to the core selection unit at a time, the core selection unit also outputs an instruction ID to identify the instruction within the instruction store (not shown). In an embodiment where each instruction store 122 transmits only one instruction to the core selection unit 110 at a time, such as when the instruction store 122 is a queue with an instruction at its head, no such instruction ID (not shown) is required.

Figure 2:
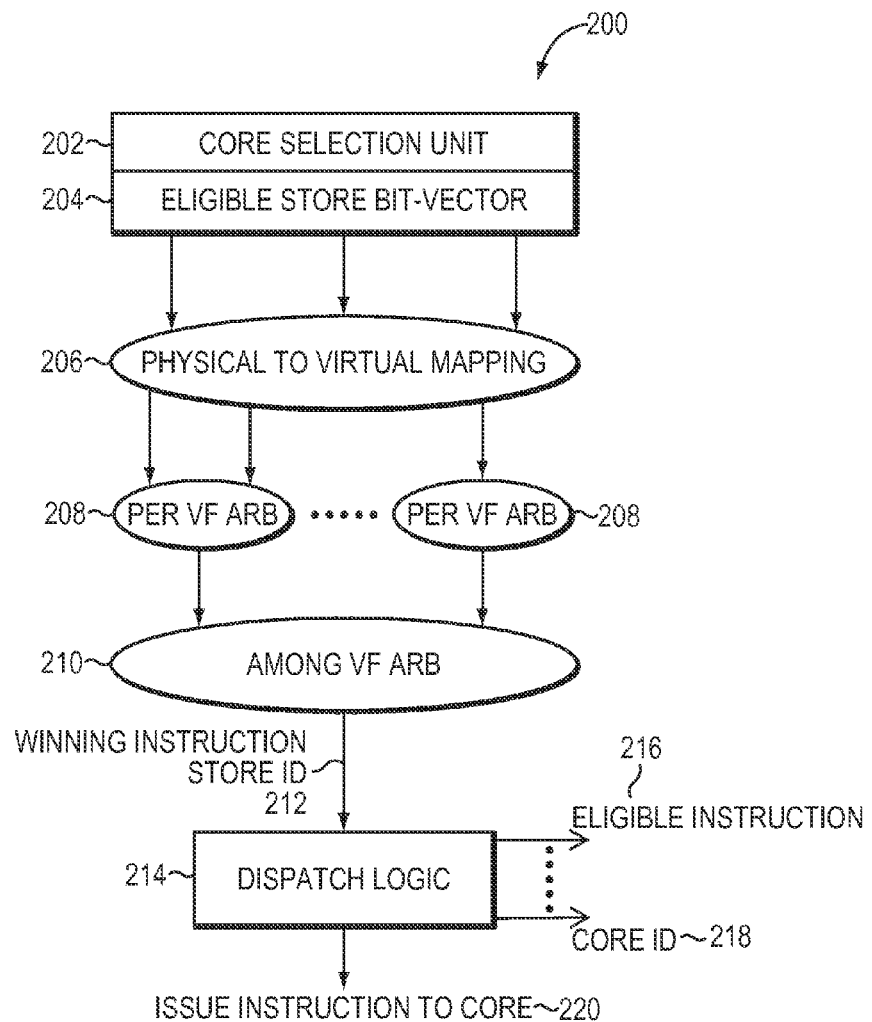
FIG. 2 is a diagram of an embodiment of virtual function mapping.

FIG. 2 is a diagram of virtual function mapping. Instruction arbitration system 200 includes a core selection unit 202. The core selection unit 202 generates an eligible instruction store vector 204 which indicates which instruction stores can be processed by an idle core or cores. All instruction stores that are eligible for processing by at least one core are then mapped to a corresponding virtual function by the virtual function mapper 206. Each virtual function then is processed by the intra-virtual function arbitrator 208, which selects a winning instruction within each virtual function. Each winning instruction is then transmitted to the inter-virtual function arbitrator 210, which selects a winning instruction among the winning instructions of each virtual function. The inter-virtual function arbitrator 210 then transmits a winning instruction store ID 212 to instruction dispatch logic 214. The dispatch logic 214 transmits a core ID 218 of the eligible idle core to the eligible instruction store 216 associated with the winning instruction store ID 212. The dispatch logic transmits an instruction dispatch signal 220 to the eligible instruction store 216 with the core ID 218, and the eligible instruction store 216 then issues the eligible instruction to a core corresponding with the core ID 218.

Figure 3:
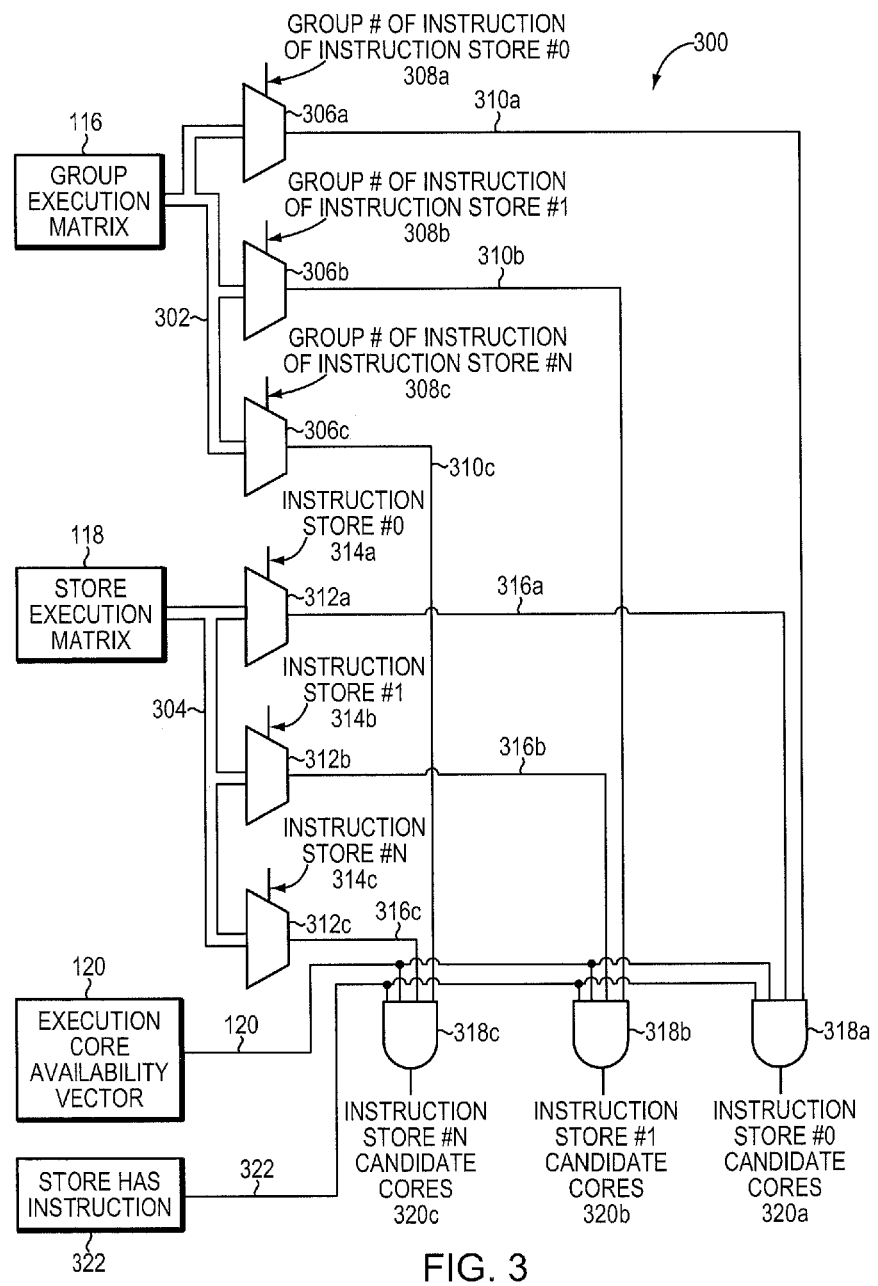
FIG. 3 is a diagram of an embodiment of core selection logic.

FIG. 3 is a diagram of core selection logic 300. The group execution matrix 116 includes a plurality of group execution masks 302. The group execution matrix 116 is coupled with group execution multiplexers 306A-C. The group execution multiplexers 306A-C are configured to select one of the plurality of group execution masks 302. The quantity of group execution multiplexers 306A-C corresponds with the number of instruction stores in the processor. When the instruction store is configured to output multiple instructions at once, more group execution multiplexers 306A-C may be necessary to select additional group execution masks 302. Each group execution multiplexer 306A-C is coupled with a group execution multiplexer selector 308A-C associated with a group number of an instruction of the instruction store. The group execution multiplexers 306A-C each output a corresponding group execution mask 310A-C.

The store execution matrix 118 includes a plurality of store execution masks 304. The store execution matrix is coupled with store execution multiplexers 312A-C. The store execution multiplexers 312A-C are configured to select one of the plurality of store execution masks 304. The quantity of store execution multiplexers 312A-C corresponds with the number of instruction stores in the processor. Each store execution multiplexer 312A-C is coupled with a store execution multiplexer selector 314A-C associated with an index number of an instruction store. The store execution multiplexer 312A-C each output a corresponding store execution mask 316A-C.

The core availability vector 120 indicates which cores are available for processing. In one embodiment, the eligible instruction store vector 322 indicates which instruction stores contain an instruction that is eligible for processing by a core.

The bitwise AND-gates 318A-C are coupled with corresponding group execution masks 310A-C, selection execution masks 316A-C, the core availability vector 120 and the eligible instruction store vector 322. In one embodiment, the quantity of bitwise AND-gates 318A-C corresponds to the number of instruction stores. However, in an embodiment where the instruction stores are configured to output more than one instruction, more bitwise AND-gates 318A-C may be required to represent additional eligible instructions. The bitwise AND-gates 318A-C performs a bitwise AND operation on the corresponding group execution masks 310A-C, corresponding store execution masks 316A-C and the core availability vector 120. In some embodiments, the bitwise AND-gates 318A-C also input a bit of the eligible instruction store vector 322 corresponding with the appropriate instruction store. The bitwise AND-gates 318A-C then output corresponding instruction store candidate cores 320A-C. In one embodiment, one candidate core is used as an index to select one entry from each instruction store candidate cores 320A-C, and only non-zero bits are considered for arbitration.

Figure 4:
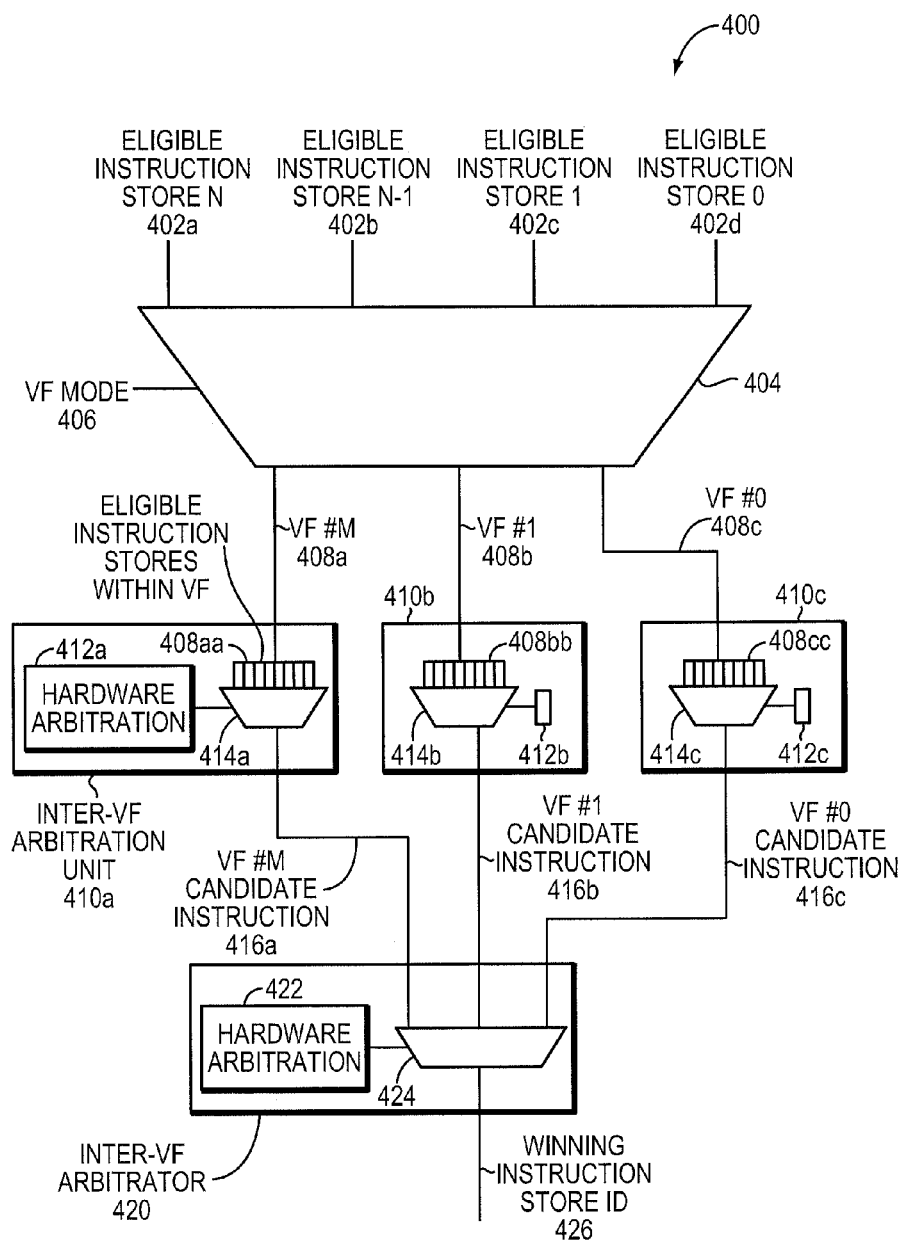
FIG. 4 is a diagram of an embodiment of a virtual function arbitration circuit.

FIG. 4 is an embodiment of a virtual function arbitration circuit 400. The virtual function mapper 404 is coupled with eligible instruction stores 402A-D and a virtual function mode register 406. In one embodiment, the eligible instruction stores 402A-D are one bit representing whether the corresponding instruction store is eligible for one core. In another embodiment, the eligible instruction stores 402A-D is a bit-vector indicating for which cores each instruction store is eligible.

In one embodiment, the virtual function mode register 406 is configured as a selector to the virtual function mapper 404. The virtual function mode register 406 is set by a host or software. The virtual function mode register 406 indicates whether it should run in physical function or which virtual function mode the processor should run in. The virtual function mapper 404 then outputs virtual functions 408A-C. The number of virtual functions 408A-C corresponds to the virtual function mode represented by the virtual function mode register 406. In some embodiments, the quantity of virtual functions 408A-C can be 8, 16, 32, and 64. Virtual functions 408A-C include instructions of the virtual function 408AA-CC.

Intra-virtual function arbitration units 410A-C contain hardware arbitration module 412A-C and intra-virtual function multiplexers 414A-C. The intra-virtual function arbitration units 410A-C are coupled with the virtual functions 408A-C. The virtual functions 408A-C and instructions of the virtual function 408AA-CC are coupled with the intra-virtual function multiplexer 414A-C. Hardware arbitration units 412A-C are coupled with the intra-virtual function multiplexer 414A-C as a selector. In some embodiments, the virtual functions 408A-C and instructions of the virtual function 408AA-CC are coupled with hardware arbitration units 412A-C. The intra-virtual function multiplexers 414A-C output virtual function candidate instructions 416A-C based on the hardware arbitration units 412A-C. The intra-virtual function arbitrators 410A-C outputs the same virtual function candidate instruction 416A-C corresponding to its intra-virtual function multiplexer 414A-C.

The inter-virtual function arbitrator 420 contains a hardware arbitration module 422 and an inter-virtual function multiplexer 424. The inter-virtual function arbitrator 420 is coupled with the virtual function candidate instructions 416A-C. The hardware arbitration module 422 is coupled with the inter-virtual function multiplexer 424 as a selector. In some embodiments, the hardware arbitration module 422 is also coupled with the virtual function candidate instructions 416A-C. The inter-virtual function multiplexer 424 selects and outputs one of the virtual function candidate instructions 416A-C, and the inter-virtual function arbitrator 420 outputs the same as a winning instruction store ID 426.

The method of hardware arbitration used by hardware arbitration modules 412A-C and 422 can be any method of arbitration. Examples methods of hardware arbitration include round robin arbitration, weighted round robin arbitration, fixed priority arbitration, and random arbitration.

Figure 5:
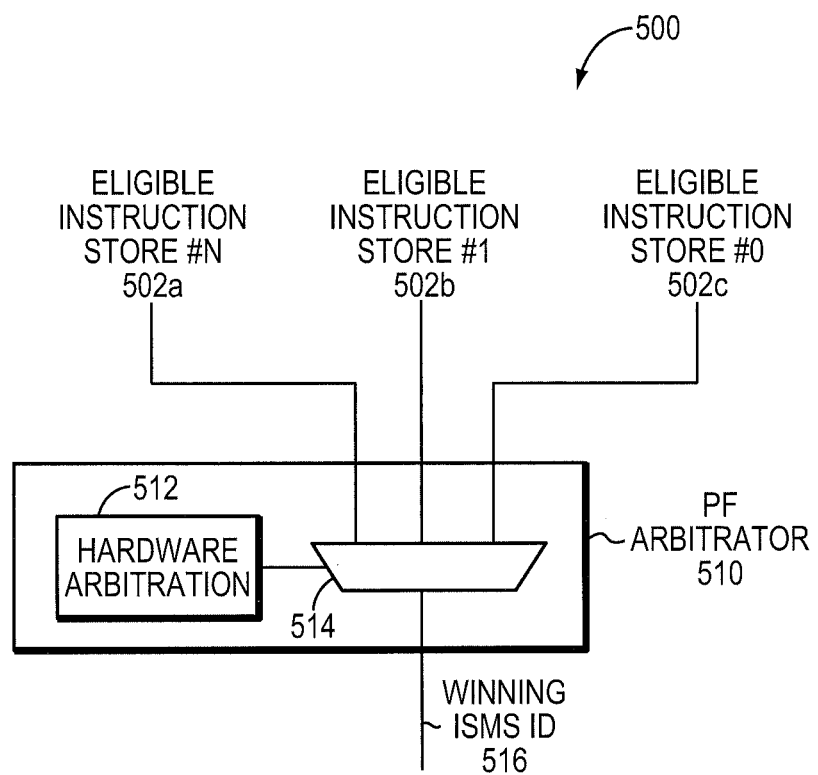
FIG. 5 is a diagram of an embodiment of a physical function arbitration circuit.

FIG. 5 is an embodiment of a physical function arbitration circuit 500. A physical function arbitrator 510 is coupled with eligible instruction stores 502A-C. The physical function arbitrator includes a hardware arbitration module 512 and a physical function arbitration multiplexer 514. The hardware arbitration module 512 coupled with the physical function arbitration multiplexer 514 and is configured as a selector. The physical function arbitration multiplexer 514 is coupled with the eligible instruction stores 502A-C. In some embodiments, the hardware arbitration module 512 is coupled with the eligible instruction stores 502A-C. The physical function arbitration multiplexer selects and outputs a winning instruction store ID 516, which both the physical function arbitration multiplexer 514 and the physical function arbitrator 510 outputs.

Figure 6A:
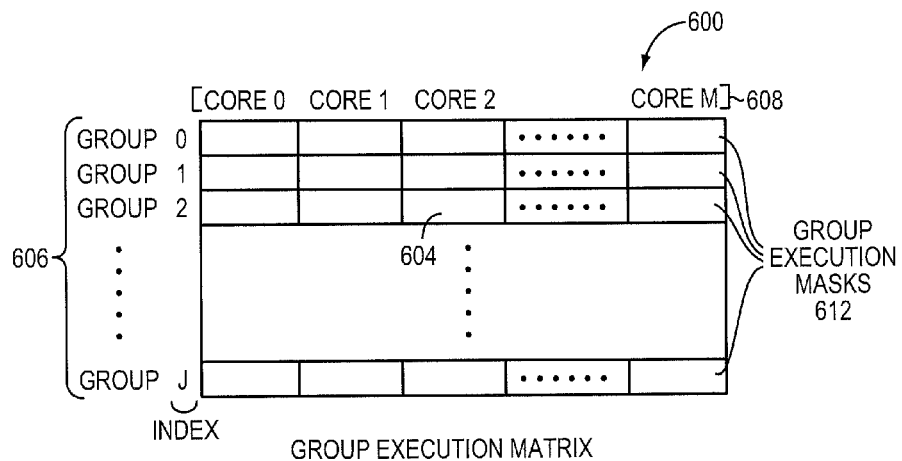
FIG. 6A is a diagram of an embodiment of a group execution matrix.

FIG. 6A is an embodiment of a group execution matrix 600. Group execution matrix 600 can correspond to group execution matrix 116 in some embodiments. Group execution matrix 600 includes a plurality of group execution masks 612. Each group execution mask 612 is one row of the group execution matrix 600 and corresponds to a group number associated with an instruction. The matrix is indexed by the group number index 606 which indicates there are j+1 groups and a core number index 608 which indicates there are m+1 cores. In one embodiment, the group execution matrix uses values of j=7 and m=63, representing 8 groups and 64 cores. Further, each group execution mask 612 includes typical group execution mask values 604 corresponding to each core of the processor. The typical group execution mask value 604 represents whether an instruction from the group indicated by the group number index 606 can be dispatched to the core indicated by the core number index 608.

Figure 6B:
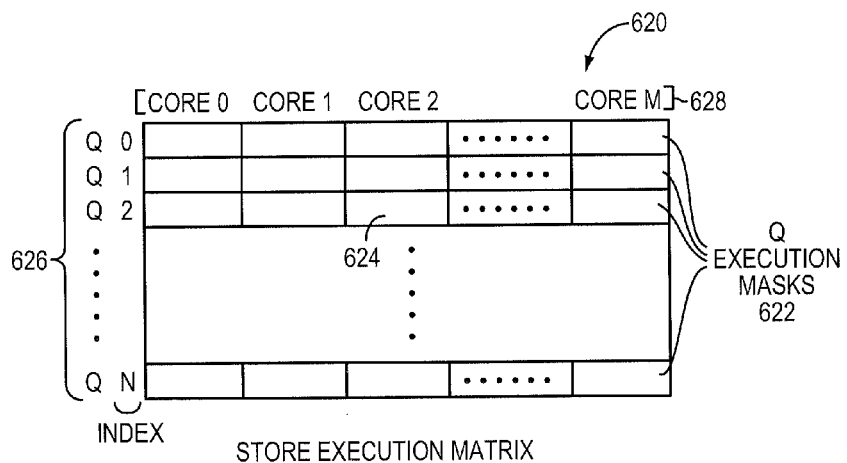
FIG. 6B is a diagram of an embodiment of a store execution matrix.

FIG. 6B is an embodiment of an instruction store execution matrix 620. Store execution matrix 620 can correspond to store execution matrix 118 in some embodiments. Store execution matrix 620 includes a plurality of store execution masks 622. Each store execution mask 622 is one row of the store execution matrix 620 and corresponds to a store number index 626 associated with an instruction store. The matrix is indexed by store number index 626 which indicates there are n+1 instruction stores and a core number index 628 which indicates there are m+1 cores. In one embodiment, the store execution matrix 620 uses values of n=63 and m=63, representing 64 instruction stores and 64 cores. Further, each store execution mask 622 includes typical store execution mask values 624 corresponding to each core of the processor. The typical store execution mask value 624 represents whether an instruction from the instruction store indicated by the store number index 626 can be dispatched to the core indicated by the core number index 628.

Figure 6C:
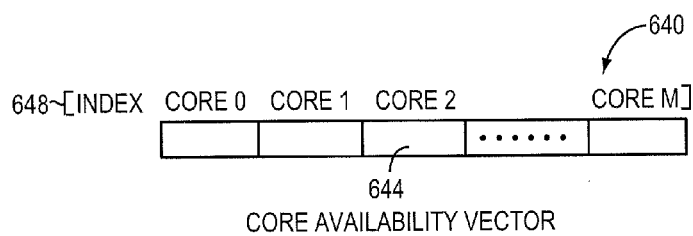
FIG. 6C is a diagram of an embodiment of a core availability vector.

FIG. 6C is an embodiment of a core availability vector 640. Core availability vector 640 can correspond to core availability vector 120 in some embodiments. The core availability vector is indexed by a core number index 648. The core availability vector includes a plurality of typical core availability vector values 644 corresponding to the availability of the core of the processor indicated by the core number index 648.

FIG. 7 is an example embodiment of the interaction between a host system with software and a chip including virtual functions and core selection and arbitration units. An integrated host and chip system 700 includes a host and software 702 coupled with memory 704 and also a chip 710 through host and chip connection 706. Chip 710 includes a host interface 712, a plurality of cores 714, and an instruction store manager 720. The host interface 712 is coupled with the instruction store manager 720 and the cores 714. The cores 714 and instruction store manager 720 are also coupled to each other.

The instruction store manager 720 includes a group execution matrix 722, a store execution matrix 724, and instruction stores 726A-C. The host and software 702 are configured to communicate bidirectionally with the chip 710. The host and software 702 can signal an instruction store 726A-C that there is an available instruction. If the instruction store has available space, it can fetch instructions from the host and software's 702 memory 704 through the host interface 712. The host and software can also set the group execution matrix 722 and the store execution matrix 724. The chip 710 can communicate the results of instructions processed by the cores 714 back to the host and software 702 through the host and chip connection 706 to be recorded in memory 704.

While this invention has been particularly shown and described with references to example embodiments thereof, it will be understood by those skilled in the art that various changes in form and details may be made therein without departing from the scope of the invention encompassed by the appended claims.

What is claimed is:

1. A processor comprising:
   a plurality of processing cores;
   a plurality of instruction stores, each instruction store storing at least one instruction, each instruction having a corresponding group number, each instruction store having a unique identifier;
   a store component storing a group execution matrix and a store execution matrix, the group execution matrix comprising a plurality of group execution masks, each group execution mask corresponding to a given group number and indicating which cores can process an instruction from the given group number; the store execution matrix comprising a plurality of store execution masks;
   a core selection unit configured to for each instruction within each instruction store:
   select a store execution mask from the store execution matrix using the unique identifier of a selected instruction store as an index, select at least one group execution mask from the group execution matrix using the group number of at least one selected instruction from the selected instruction store as an index, and
   for each selected group execution mask of the at least one group execution masks, perform logic operations on the selected group execution mask and the store execution mask to create a core request mask, the core request mask corresponding to the selected instruction store and indicating zero, one, or more candidate cores; and
   an arbitration unit configured to determine instruction priority among each instruction, each instruction store having at least one corresponding core request mask, accordingly assign an instruction for each available core, where the core request mask corresponding to the instruction store of the instruction indicates candidate cores that intersect with the available cores, and signal the instruction store corresponding to the assigned instruction to send the assigned instruction to the available core.

2. The processor of claim 1, wherein each instruction store includes a queue, and the core selection unit is configured to select one group number corresponding to the instruction at the front of the queue.

3. The processor of claim 1, wherein each instruction store is further configured to dispatch an instruction to any of the plurality of cores.

4. The processor of claim 1, wherein each instruction store is assigned to one of a plurality of virtual functions.

5. The processor of claim 4, wherein the arbitration unit determines instruction priority among the virtual functions by a method of hardware arbitration.

6. The processor of claim 4, further comprising a plurality of virtual function arbitration units configured to determine instruction priority within the virtual functions by a method of hardware arbitration.

7. The processor of claim 6, wherein the plurality of virtual function arbitration units is configured to determine instruction priority among the instruction stores.

8. The processor of claim 4, wherein the plurality of virtual functions is configured to interface with a host, receive instructions and distribute the instructions to its corresponding instruction stores.

9. The processor of claim 1, wherein the arbitration unit is further configured to determine instruction priority by performing a method of hardware arbitration.

10. The processor of claim 1, wherein the core selection unit is further configured to perform a bitwise and—operation on the selected group execution mask and the selected store execution mask to create the core request mask corresponding to the selected instruction store.

11. The processor of claim 1, further comprising a core availability vector, wherein the core selection unit is further configured to perform a bitwise and—operation on the selected group execution mask, the selected store execution mask, and the core availability vector to create the core request mask corresponding to the selected instruction store.

12. The processor of claim 1, further comprising a dispatch unit configured to receive a unique identifier of the selected instruction store and an identification number of an available core and produce a signal to the selected instruction store to issue an instruction to the available core indicated by the identification number.

13. The processor of claim 1, wherein at least one of the group execution matrix and the store execution matrix is set to affect the quality of service of a physical function or a virtual function among the plurality of cores.

14. The processor of claim 1, wherein the instruction stores are at least one of compression instruction stores, cryptography instruction stores, video processing instruction stores, image processing instruction stores, or general instruction stores.

15. The processor of claim 1, wherein each instruction store is assigned to a physical function, and the arbitration unit is configured to determine instruction priority within the physical function by a method of hardware arbitration.

16. A method comprising:
   on the clock cycle of a processor with a plurality of cores and plurality of instruction stores, for each instruction within the instruction stores:
   selecting a store execution mask from a store execution matrix using a unique identifier of a selected instruction store as an index;
   selecting at least one group execution mask from a group execution matrix using a group number corresponding to an instruction of the selected instruction store as an index, each group execution mask corresponding to a given group number and indicating which cores can process an instruction from the given group number;
   for each selected group execution mask of the selected group execution masks, performing logic operations on at least the selected group execution mask and the selected store execution mask to create a core request mask, the core request mask corresponding to the selected instruction store and indicating zero, one, or more candidate cores, each core request mask added to a core request matrix indexed by the unique identifier of each instruction store; and on the clock cycle of the processor:

arbitrating to determine instruction priority among the individual instructions corresponding to the plurality of core request masks;

assigning an instruction to each available core, where a core request mask corresponding to the instruction store of the instruction indicates candidate cores that intersect with the available cores;

signaling the instruction store corresponding to the assigned instruction to send the assigned instruction to the available core.

17. The method of claim 16, wherein each instruction store includes a queue, selecting at least one group execution mask from a group execution matrix selects only one group number corresponding to the instruction at the front of the queue.

18. The method of claim 16 wherein the plurality of instruction stores are configured to dispatch instructions to the plurality of cores.

19. The method of claim 16, wherein each instruction store is assigned to one of a plurality of virtual functions.

20. The method of claim 19, wherein an arbitration unit arbitrates instruction priority among the virtual functions by a method of hardware arbitration.

21. The method of claim 19, wherein a plurality of virtual function arbitration units arbitrate instruction priority within the virtual functions by a method of hardware arbitration.

22. The method of claim 16, wherein performing logic operations comprises performing a bitwise and—operation on the selected group execution mask and the selected store execution mask to create the core request mask corresponding to the selected instruction store.

23. The method of claim 16, wherein performing logic operations further comprises performing a bitwise and—operation on the selected group execution mask, the selected store execution mask, and a core availability vector, the core availability vector indicating which of the plurality of cores are available for processing, to create the core request mask corresponding to the selected instruction store.

24. The method of claim 16, wherein arbitrating further comprises determining instruction priority by performing method of hardware arbitration.

25. The method of claim 16, further comprising dispatching the assigned instruction to the selected core using a dispatch unit configured to receive a unique identifier of the selected instruction store, the selected instruction store and an identification number of an available core, and produce a signal to the selected instruction store an instruction to the available core.

26. The method of claim 16, further comprising assigning each instruction store to one of a plurality of virtual functions, the plurality of virtual functions configured to interface with a host, receive instructions, and distribute the instructions to its assigned instruction stores.

27. The method of claim 16, further comprising setting at least one of the group execution matrix and the store execution matrix to affect the quality of service of a physical function or a virtual function among the plurality of cores.

28. The method of claim 16, wherein the instruction stores are at least one of compression instruction stores, cryptography instruction stores, video processing instruction stores, image processing instruction stores, or general instruction stores.

29. The method of claim 16, further comprising assigning each instruction store to a physical function, wherein the arbitration unit is configured to determine instruction priority within the physical function by a method of hardware arbitration.

* * * * *